Nov. 13, 1928.

W. H. CAMPBELL 1,691,756

MOLD AND METHOD OF MAKING SAME

Filed Sept. 10, 1927

Inventor
Wallace H. Campbell

R.O. Dingman

Attorney

Patented Nov. 13, 1928.

1,691,756

UNITED STATES PATENT OFFICE.

WALLACE H. CAMPBELL, OF AKRON, OHIO, ASSIGNOR TO THE GOODYEAR TIRE & RUBBER COMPANY, OF AKRON, OHIO, A CORPORATION OF OHIO.

MOLD AND METHOD OF MAKING SAME.

Application filed September 10, 1927. Serial No. 218,807.

My invention relates to molds and methods of making them and it has particular relation to a method that is especially applicable to the production of vehicle tire molds, and to the product obtained by practising the method.

It is customary to construct tire molds entirely of metal by casting or forging operations. Such methods are satisfactory for rough work; that is, for the production of articles having relatively even surfaces or when accuracy is not required. It is practically impossible, however, to produce an accurate mold having irregular patterns therein, such, for example, as the tread design of a vehicle tire casing, by either of these methods, because of shrinkage of the metal during cooling.

To overcome this difficulty, metallic so-called "blanks" are forged to conform roughly to the desired contour and are then machined to accurate dimensions and configuration. As the machining of the molds is exceedingly laborious and time consuming, it constitutes a large portion of the complete cost of the mold.

One object of my invention is to provide a novel method of making tire molds which obviates the necessity for machining the mold.

Another object of my invention is to provide a method of making tire molds which involves the molding of a plastic non-shrinkable substance to produce the tread-forming section of the mold in contra-distinction to the present practice of casting or forging metal to produce a corresponding section.

A further object of my invention is to provide a method of making a tire mold which involves the utilization of casein or a casein compound that is molded to produce the tread-forming section thereof, and applying heat and pressure to harden the section.

For a better understanding of my invention, reference may now be had to the accompanying drawings, forming a part of this specification, of which;

Figure 1:
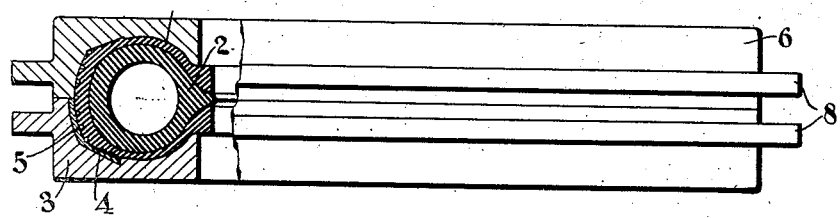
Fig. 1 is a side elevational view of a tire mold enclosing a tire and an airbag in position to shape the tread-forming section of the mold in accordance with my invention, a portion being broken away to illustrate other portions in cross-section.
Figure 2:
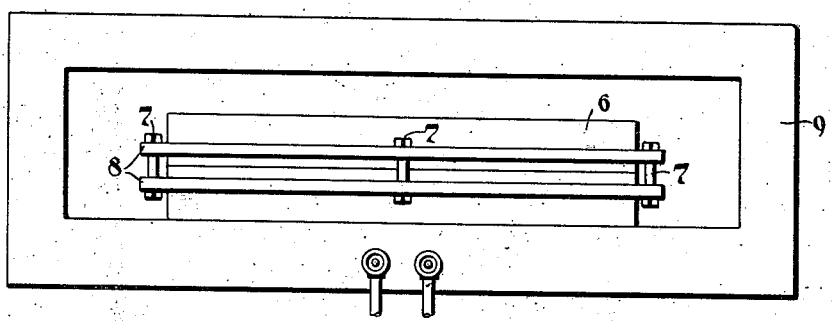
Fig. 2 is a side elevational view, on a smaller scale, illustrating the mold and contents shown in Fig. 1 disposed within a kiln.
Figure 3:
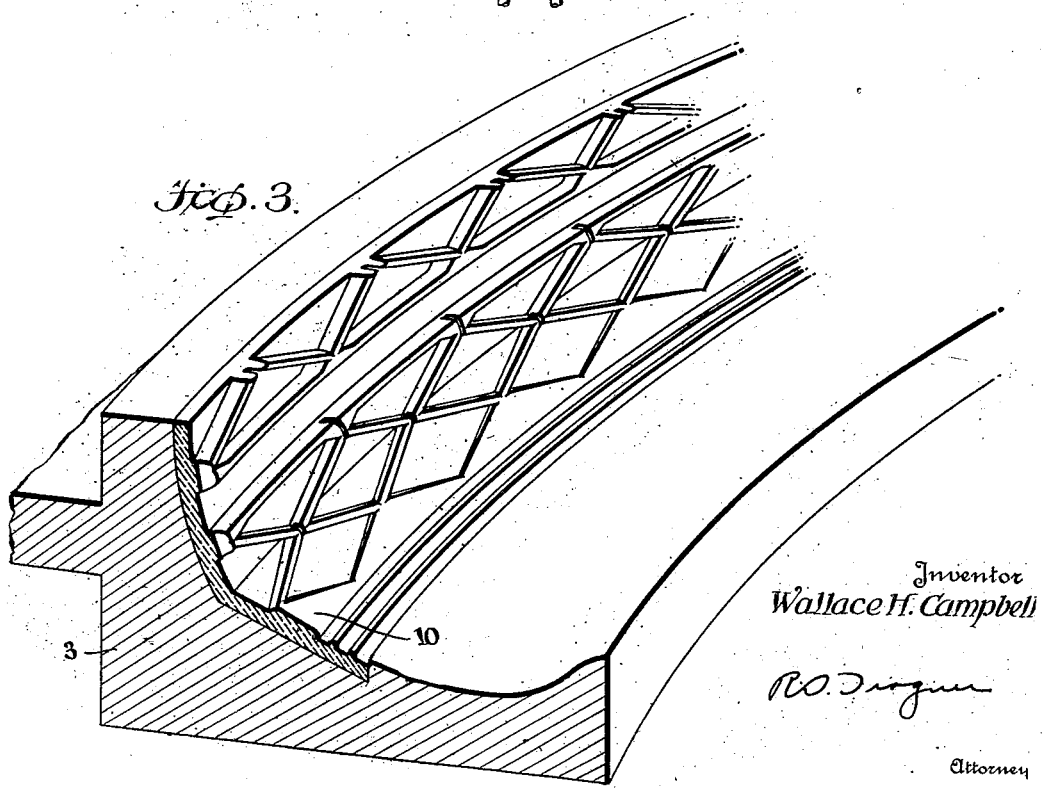
Fig. 3 is a fragmentary perspective view of a portion of a tire mold embodying the features of my invention.

In the practice of my invention, a tire or other similar flexible object 1 mounted on an airbag 2 is supported in a mold section 3 with a portion 4 of its surface, which includes the tread design disposed in spaced relation to the interior of the mold section. The space between the mold section and the tread surface is then filled with a plastic substance 5, and a second mold section 6 is superimposed upon the section 3. The section 6 differs from the lower section 3 in that it abuts the tread surface.

When the parts have been assembled, as just described and as shown in Fig. 1 of the drawing, the mold sections are drawn tightly together by means of bolts 7 passing through annular flanges 8 formed on the sections, and the airbag is inflated to cause the inner surface of the plastic material to assume the contour of the tread surface in intaglio. The entire mold is then inserted within an oven 9 and heated to dry and harden the formerly plastic substance 5.

The present invention is in part predicated upon my discovery, that casein and compounds containing casein are especially applicable for use in forming the tread-forming surface of the mold, as above described. The substance commercially known as galalith, which is casein rendered insoluble by acids and then treated with formaldehyde, is believed to be the preferred form of casein to employ. Pure casein and galalith may both be obtained commercially in powdered form and are readily united with a sufficient amount of liquid to render them plastic for use.

When the mold is removed from the oven, the tread-forming surface 10 thereof is practically perfect in contour, and, therefore, requires no machining, by reason of the fact that the casein or the casein compound employed does not shrink perceptibly as it hardens to solid form. This surface is also non-inflammable, is as hard as stone and does not soften or melt at temperatures far above that employed in the vulcanization of tires.

Although I have illustrated only one form which my invention may assume and have described that form in detail, it will be apparent to those skilled in the art that the invention is not so limited but that various minor modifications may be made therein without departing from the spirit of my invention or from the scope of the appended claims.

What I claim is:

1. The method of making a tire mold which includes supporting a tire in a metallic mold blank in spaced relation thereto, packing the intervening space with a plastic substance containing casein and subjecting the whole to heat and pressure to harden the plastic substance.

2. The method of making a tire mold which includes applying a substance containing casein to the interior of a mold blank formed with a cavity of greater volume than a tire to be molded therein, confining such tire therein to shape the plastic substance and solidifying the plastic substance while maintaining its contour constant.

3. The method of making a tire mold which includes applying casein in plastic form to the interior of a metallic mold blank, forming the casein to the desired contour and solidifying the casein.

4. The method of making a tire mold which includes applying a plastic substance containing casein to the interior of a mold blank, forming the substance to the desired contour and solidifying the substance.

5. A tire mold having its tread-forming section formed of a substance containing casein.

6. A tire mold having its tread-forming section formed of casein hardened by the application of heat and pressure.

In witness whereof, I have hereunto signed my name.

Signed at Akron, in the county of Summit, and State of Ohio, this 9th day of September, 1927.

WALLACE H. CAMPBELL.